March 1, 1955  A. A. JERNANDER  2,703,191
MULTISTAGE LUBRICATING GUN
Filed July 10, 1952
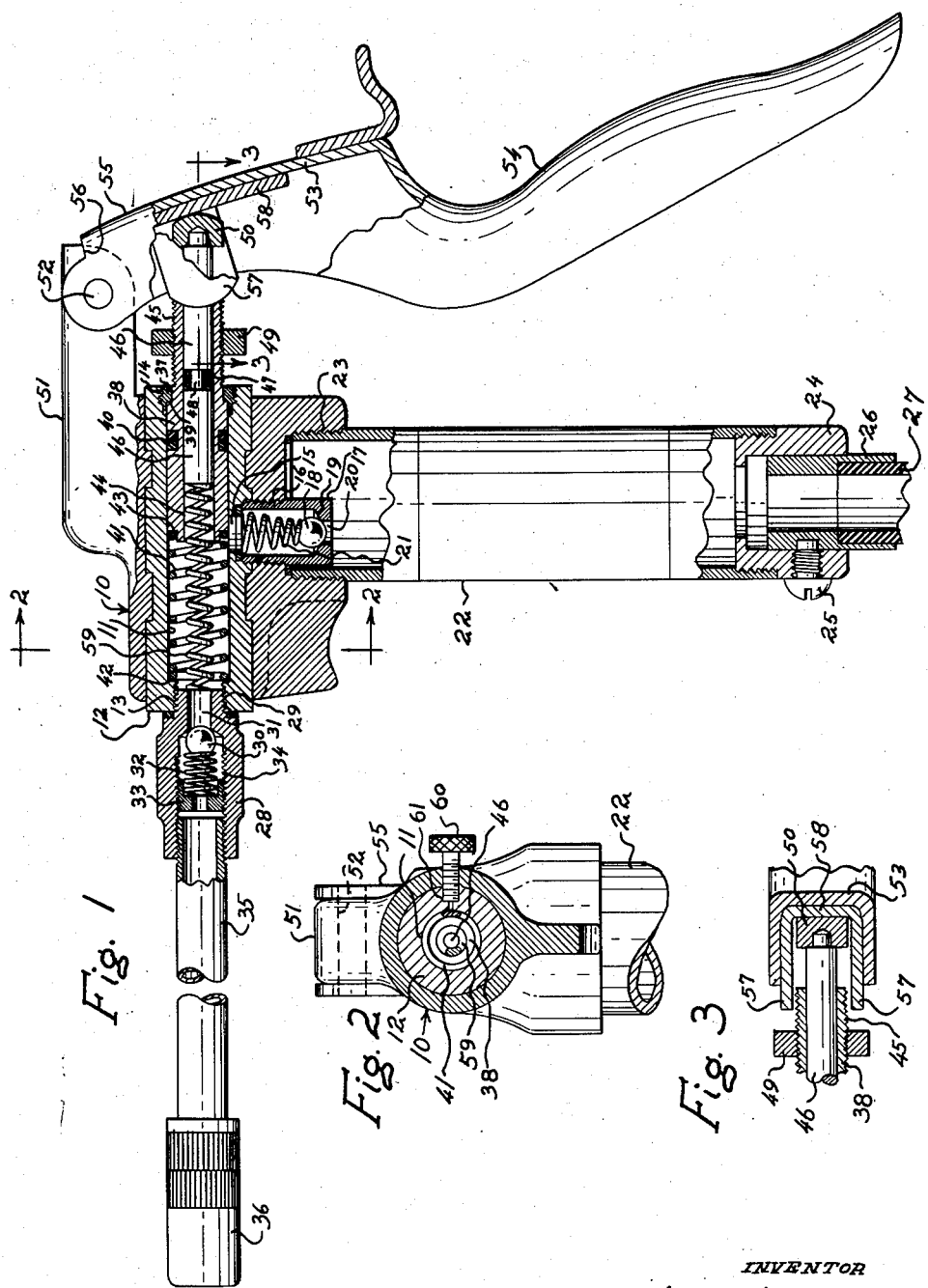
INVENTOR
ALVIN A. JERNANDER
BY Williamson, Williamson
Schroeder & Adams ATTORNEYS

United States Patent Office 2,703,191
Patented Mar. 1, 1955

2,703,191

MULTISTAGE LUBRICATING GUN

Alvin A. Jernander, Minneapolis, Minn., assignor to K-P Manufacturing Co., Minneapolis, Minn., a corporation of Minnesota Application July 10, 1952, Serial No. 298,056

9 Claims. (Cl. 222—255)

This invention relates to a multi-stage grease gun and more particularly to a reciprocably operated grease gun having provision for ejecting selectively a high volume of lubricating fluid at an ordinary pressure or a smaller volume of lubricating fluid at a higher pressure.

It is a general object of the invention to provide for a multi-stage grease gun in the use of which a larger volume of lubricating fluid may be rapidly and conveniently supplied to fittings by the use of normal actuating force such as manual movement and, when the occasion requires, can be caused to supply efficiently a smaller ejection of lubricating fluid under a higher pressure without employing additional force to the device.

Often when using forced lubricating devices it becomes necessary to employ an unusualy high pressure in order to break the seal at the grease fitting or to supply a grease line which offers resistance to the injection of lubricating fluid. Since most common grease gun devices are equipped to deliver the necessary volume of lubricating fluid such as grease to the required fittings in as short a time as possible, the emphasis is placed upon high volume displacement with a correspondingly low pressure. When the same grease gun is used upon a fitting which has become plugged or restricted the ordinary pressures developed by the grease gun are not sufficient to overcome resistance. It then becomes necessary to apply abnormally high actuating force to the grease gun in order to provide the necessary fluid pressure and this is often impossible where only limited actuating force is available. Where the grease gun must be operated manually the problem heretofore has not been satisfactorily solved. A grease gun which would develop the degree of pressure needed to pass a plugged or restricted grease fitting would obviously not have sufficient volume to quickly and efficiently supply the amount of grease required after the plug or restriction was removed. My invention contemplates a multi-stage grease gun which can deliver either a high volume of lubricating fluid and a low pressure to the fitting in question or, on the other hand, may supply temporarily or as required a low volume of lubricating fluid at a high pressure of the order necessary to counteract high resistance in the fitting.

It is another object of the invention to provide for a cheap and simple long-wearing manual grease gun having an actuator which, by the same amount of force applied thereto, will selectively develop either the high volume and low pressure of fluid desired or may develop the low volume and high pressure requisite for the purpose hereinbefore stated.

It is a further object of the invention to provide for a novel and extremely simple multi-stage grease gun in which a single manual actuator associated therewith may be reciprocated through a predetermined distance to actuate a high pressure fluid ejecting mechanism or may be reciprocated through another preselected distance to actuate an additional fluid ejecting mechanism for achieving a high volume and lower pressure of lubricating fluid.

These and other objects and advantages of my invention will more fully appear from the following description made in connection with the accompanying drawings wherein like reference characters refer to similar parts throughout the several views and in which:

Fig. 1 is a side elevation of my multi-stage grease gun with portions thereof in vertical section to better show the internal structure thereof and other portions broken to better show the entire function of the device;

Fig. 2 is a segmental vertical section of the fore part of the housing taken on the lines 2—2 of Fig. 1; and Fig. 3 is a segmental cross sectional view of the cam and bearing portions of the grease gun taken on the lines 3—3 of Fig. 1.

Referring now more particularly to the drawing, my invention comprises a housing member 10 having disposed therein an elongated opening or chamber 11. The opening 11 may be formed by a sleeve or insert 12 having a cylindrical bore and with threaded end openings 13 at the forward end thereof and 14 to the rear. A lateral opening 15 in the housing 10 communicates with the longitudinal elongated opening 11 and has a threaded portion 16 adapted to receive an inlet valve mechanism 17 having a ball check 18 seated upon a valve seat 19 so as to normally close off the inlet opening 20 while under the influence of compression spring 21. The inlet opening 20 in turn communicates with the hollow feed chamber which has an open end portion 23 for securing to the housing 10 for supplying lubricating fluid such as grease through the inlet openings 20 and 15 to the chamber 11. The lower end of hollow feed chamber 22 contains a connector element 24 having a fastening device such as set screw 25 for engaging the end 26 of a supply tube 27 which may communicate with a source of supply of lubricating fluid (not shown).

Communicating with the elongated opening 11 is an outlet or line check valve mechanism 28 which is threadably secured at 29 to the sleeve 12 so as to communicate with the forward end of the opening 11. A valve such as the ball check valve 30 is seated upon the flared portion of bore 31 by the compressive action of spring 32 which in turn is retained by a collar member 33 threadably retained in the bore 34 through the valve mechanism. A fluid line 35 is secured to the valve means as by threaded connection so as to communicate with the elongated chamber 11 and terminates at the other end in a connector 36 suitable for engagement with a grease fitting (not shown) or with a further fluid line which will ultimately be secured to the said grease fitting.

At the rear of the elongated opening 11 is a retainer element such as shouldered collar 37 threadably secured to the threads 14. A high volume plunger and cylinder bushing member 38 is slidably positioned within the elongated opening 11 and has a shouldered or offset portion 39 for engagement with the shouldered collar 37 which limits the rearward movement of the plunger and bushing element 38. Gasket or piston ring means 40 aid in maintaining a fluid tight connection between the plunger and bushing element 38 and the inner walls of the elongated opening 11. A compression spring 41 bears against the inner shoulder 42 of the sleeve 12 at the forward end and against a shouldered plunger and bushing element 38 so as to maintain it normally in the stop position with the shoulders 39 and 37 in contact. The plunger and bushing element 38 has an internal bore 44 which extends throughout its length including the threaded extension 45 of the plunger and bushing element which extends rearwardly of the housing 10. A second and smaller plunger 46 is slidably disposed within the bore 44 of the high volume plunger and cylinder bushing 38 so as to provide means for low volume and high pressure delivery of lubricating fluid through the device as hereinafter set forth. Gasket or piston ring means 47 may be disposed about a reduced portion 48 in the low volume plunger 46 so as to maintain a fluid tight connection between the relatively slidable plungers 38 and 46. Adjustably mounted on the threaded extension 45 of the high volume plunger and bushing 38 is a bearing collar or abutment 49. Mounted at the rearwardly extending end of low volume plunger 46 is a bearing head 50 for sliding and pressing engagement therewith. At the upper part of housing 10 is a rearwardly extending rigid portion 51 to which is pivotally secured at 52 a lever 53 formed of a bent sheet of material such as steel to form manual actuating means with a hand grip portion 54 and an actuating portion 55 with a shouldered stop 56 to limit the outward movement thereof when it engages a portion of the housing extension 51. The bent-over portions of the actuating lever are formed into cam means 57 for engagement with the bearing collar 49 during depression of the lever actuator 53. A bearing plate 58 is secured to the inside rear wall of the upper portion 55 for engagement with the bearing head 50 at all times. The plunger 46 is thus yieldably maintained in its rearwardly urged position by a compression spring 59 which is disposed partially within the high volume plunger and bushing 38 and partially within the elongated chamber 11 with the ends bearing upon the valve connection 29 at the forward end of the spring and upon the forward face of plunger 46 at the rearward end of the spring 59. An air vent valve 60 may be supplied for allowing the escape of air from the inside of chamber 11. This valve may comprise a needle valve mounted in a vent 61 at the side of housing 10 as shown in Fig. 2.

During the operation of my multi-stage grease gun the inlet tube 27 is placed in communication with the source of supply of lubricating fluid and the bearing collar 49 is threadably adjusted to the position desired during the operation of the grease gun. If it is desired to use the gun entirely for high volume and low pressure use, the collar may be adjusted rearwardly so as to abut the cam means 57 at the outermost normal position of the lever actuator 53. In this position the bearing head 50 of the high pressure plunger 46 will be actuated simultaneously with the high volume plunger and bushing member 38. The net result will be to present a combinative piston or plunger actuation operating over the entire cross sectional area of the elongated compartment 11. Lubricating fluid within the compartment will therefore be ejected in high volume through the check valve 28, the fluid line 35 and to the connection 36 between the fluid line 35 and the desired grease fitting. Upon the backward stroke of the lever 53 the compression spring 41 will urge the high volume plunger and bushing member backwardly to maintain contact between the bearing collar 49 and the cam means 57. Simultaneously the compression spring 59 will urge the low volume and high pressure plunger 46 rearwardly to maintain contact between the bearing head 50 and the bearing plate 58 on the lever 53. At the same time the line valve 28 will be closed and the increasing volume of the elongated chamber 11 will cause lubricating fluid to enter through the inlet 20, past the valve ball 18 and through the transverse inlet 15. The valve ball 18 will yield against the comparatively weaker spring 21 so as to allow entrance of lubricating fluid under the influence of the relatively stronger springs 41 and 59. The lever 53 may be actuated successively so as to continue the ejection of lubricating fluid in high volume and under comparatively low pressure.

Now where it is desired to utilize the grease gun as a low volume and high pressure device the bearing collar 49 is adjusted to a position to the left of that shown in Fig. 1 so as to maintain it out of operating contact with the cam means 57. While thus positioned, the high volume plunger and bushing member 38 remains in its rearwardly stopped position serving only as a cylinder or bushing for the relative reciprocation of the low volume and high pressure piston 46. Similarly to the actuation first described, depression of the lever 53 will eject lubricating fluid from the chamber 11, past the line check valve mechanism 28 and into the line 35 on the forward stroke. Upon the rearward stroke, the compression spring 59 will maintain the low pressure piston 46 and its bearing head 50 in contact with the bearing plate 58, increasing the volume of chamber 11 so as to cause lubricating fluid within the hollow feed chamber 22 to enter the chamber 11 past the valve ball 18 as previously described. It will be noted, however, that a much lower volume is now ejected for each stroke but since the same total force applied to lever 53 will be transmitted through a smaller cross sectional piston area, the fluid pressure within the chamber 11 will be increased inversely as the ratio of the cross sectional area of plunger 46 to the total area of the cross section of the high volume plunger and bushing member 38 plus that of the smaller plunger 46. Again, the lever 53 may be operated successively as desired.

Where the operator may wish to use the gun both as a high pressure gun and as a low pressure gun in quick succession, as for example, when a momentary high pressure is desired to break away a restriction from the grease fitting, followed by high volume and low pressure introduction of fluid through the fitting, then he may adjust the bearing collar 49 to the intermediate position shown in Fig. 1. He may then apply a full stroke to the lever 53 until pressure builds up in the line then pump the lever 53 between its outermost extended position up to the bearing collar or abutment member 49 to operate only the high pressure plunger 46. When the resistance is overcome, the lever may be pumped in the high volume range with the entire plunger assembly functioning. At any time that high resistance is again experienced the lever 53 may be pumped in short strokes without moving the abutment member. It is understood, of course, that the bearing collar or abutment member is rapidly adjustable by the thumb of the same hand which holds the lubricating gun and actuates the lever and the operator may quickly attain the pressure characteristic which he desires.

It may thus be seen that I have devised a multi-stage grease gun which has extreme versatility in manual use, the adjustment of which is so simple as to be responsive practically simultaneously to the use thereof. The simple multi-stage accomplishment has been acquired without the sacrifice of any of the simple advantages of the laws of hydraulics. For the same manual force applied to the actuating lever a variety of results may be obtained according to the needs of the operator. It will be further noted that the resistance to wearing in the working parts of the gun is intensified by causing the high volume plunger to come to rest and function solely as a piston cylinder when the high pressure plunger is utilized. This arrangement is, of course, far superior to that in which additional force required is applied from an external point to the same internal mechanism, both for low pressures and high pressures.

It will, of course, be understood that various changes may be made in the form, details, arrangement and proportions of the parts without departing from the scope of my invention.

What I claim is:

1. A multi-stage grease gun comprising a housing having an elongated opening disposed therethrough, a plunger assembly reciprocably mounted within the opening, said plunger assembly having a total piston face area for creating fluid pressure within the elongated opening, an independently reciprocable plunger whose piston face area comprises a portion of said total piston face area, and means for actuating the entire plunger assembly so as to eject under pressure a relatively high volume of fluid from said elongated opening and for selectively and forcibly actuating only the independently reciprocable plunger to eject a smaller amount of fluid under a relatively higher pressure.

2. A multi-stage grease gun comprising a housing having an elongated opening disposed therethrough, a plunger assembly reciprocably mounted within the opening, said plunger assembly having a piston face area for creating fluid pressure within the elongated opening, an independently reciprocable plunger whose piston face area comprises a portion of said total piston face area, an inlet to the elongated opening for introducing fluid such as lubricating grease, an outlet for ejecting the fluid to a point remote from said housing, and means for actuating the entire plunger assembly so as to eject under pressure a relatively high volume of fluid from said outlet and for selectively and forcibly actuating only the independently reciprocable plunger to eject from said outlet a smaller amount of fluid under a relatively high pressure.

3. A reciprocating type lubricating gun comprising a housing having a chamber disposed therein, with an outlet forwardly thereof, a first plunger slidably positioned within the chamber and normally urged backwardly toward the rear end thereof, a second plunger also mounted slidably within said chamber and likewise normally urged backwardly toward the rear end thereof, and actuating means normally engaging said second plunger for independent reciprocation thereof through a preselected distance and operable to actuate the first plunger when operated through another preselected distance whereby said actuating means may be employed to deliver a large volume of low pressure fluid and a low volume of fluid at a high pressure.

4. A reciprocating type lubricating gun comprising a housing having a chamber disposed therein with an outlet at the forward end thereof, a first plunger slidably positioned within the chamber and normally urged backwardly toward the rear end thereof, a second plunger also mounted slidably within said chamber and likewise normally urged backwardly toward the rear end thereof, and actuating means normally engaging said second plunger for independent reciprocation thereof through a preselected distance and operable to actuate both the first and second plungers when operated through another preselected distance whereby said actuating means may be employed to deliver a large volume of low pressure fluid and a low volume of fluid at a high pressure.

5. A reciprocating type lubricating gun comprising a housing having a chamber disposed therein, a valved outlet at the forward end thereof, a valved inlet intermediate the ends thereof, a first plunger slidably positioned within the chamber and normally urged backwardly toward the rear end thereof, a second plunger also mounted slidably within said chamber and likewise normally urged backwardly toward the rear end thereof, and actuating means normally engaging said second plunger for independent limited reciprocation thereof through a preselected distance and operable to actuate both the first and second plungers when operated through another preselected distance whereby said actuating means may be employed to deliver selectively a large volume of low pressure fluid and a low volume of fluid at a high pressure.

6. A reciprocating type lubricating gun comprising a housing having a chamber disposed therein, a valved outlet at the forward end of said chamber, a valved inlet intermediate the ends thereof, a first plunger slidably positioned within the chamber and normally urged backwardly toward the rear end thereof, a second plunger slidably mounted within said first plunger and likewise normally urged backwardly toward the rear end of said chamber, and actuating means normally engaging said second plunger for independent reciprocation thereof through a preselected distance and for joint reciprocation of both the first and second plungers when operated through another preselected distance whereby said actuating means may be employed to deliver selectively from said outlet a large volume of low pressure fluid and a low volume of fluid at a high pressure.

7. A multi-stage lubricating gun comprising a housing having a chamber disposed therethrough for containing lubricating fluid, a piston assembly slidably mounted adjacent the rear of said chamber, said assembly including a first piston having a rearward extension connected therewith and stop means to limit the backward movement thereof with respect to said housing, a second reciprocable piston interfitted with the first piston and having a rearward extension beyond that of said first piston, and adjustable abutment means mounted on said first piston for limiting the forward movement thereof with respect to said housing.

8. A multi-stage lubricating gun comprising a housing having a chamber disposed therethrough for containing lubricating fluid, a piston assembly slidably mounted adjacent the rear of said chamber said assembly including a first piston having a rearward extension connected therewith and stop means to limit the backward movement thereof with respect to said housing, resilient means within said housing for normally urging said first piston backwardly against said stop means, a second reciprocable piston interfitted with the first piston and having a rearward extension beyond that of said first piston, resilient means for retracting said second reciprocable piston from its forward position, and adjustable abutment means mounted on the rearward extension of said first piston for limiting the forward movement thereof with respect to said housing.

9. The subject matter of claim 8, and a handle element pivotally mounted upon said housing and engageable in its forward movement first with said rearward extension of said second reciprocable piston for reciprocation thereof and then engageable with the rearward extension of said first piston at the adjustable abutment means.

References Cited in the file of this patent
UNITED STATES PATENTS

| | | |
|---|---|---|
| 1,690,221 | Fesler | Nov. 6, 1928 |
| 1,696,606 | Hundemer | Dec. 25, 1928 |